July 22, 1924.

D. H. SCOTT 1,502,125

LIQUID LEVEL INDICATOR

Filed Feb. 24, 1921

Inventor
D. H. Scott.

By Fisher     Attorneys

Patented July 22, 1924.

UNITED STATES PATENT OFFICE.

1,502,125

DUDLEY H. SCOTT, OF CLEVELAND, OHIO.

LIQUID-LEVEL INDICATOR.

Application filed February 24, 1921. Serial No. 447,467.

*To all whom it may concern:*

Be it known that I, DUDLEY H. SCOTT, a citizen of the United States, residing at Cleveland, in the county of Cuyahoga and State of Ohio, have invented certain new and useful Improvements in a Liquid-Level Indicator, of which the following is a specification.

My invention relates to liquid level indicators, and the invention is of especial utility in determining the liquid level in an ammonia receiver, or in any other vessel or container in which the use of a glass gauge or column is not absolutely safe. Thus, my conception is to provide the receiver or container with a gauge device comprising a tube of non-magnetic metal in which the liquid is adapted to rise and fall and within which a hollow steel ball may be confined to rise or fall with the liquid or to be bodily lifted to the level of the liquid by a magnetic indicator constructed to slide upon the gauge tube and adapted to be easily engaged and disengaged from the tube. This magnetic device also preferably comprises a permanent magnet equipped with an indicating needle or its equivalent wherewith to show the position of the ball within the non-transparent gauge.

Figure 1:
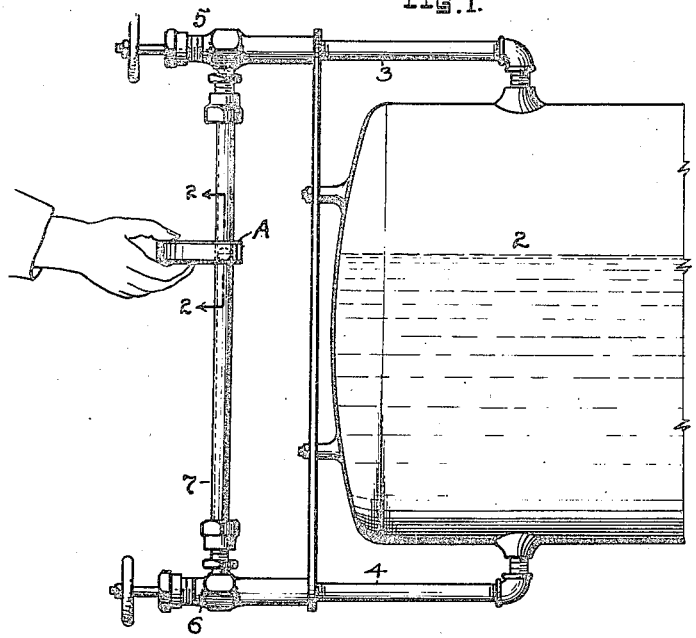
Figure 2:
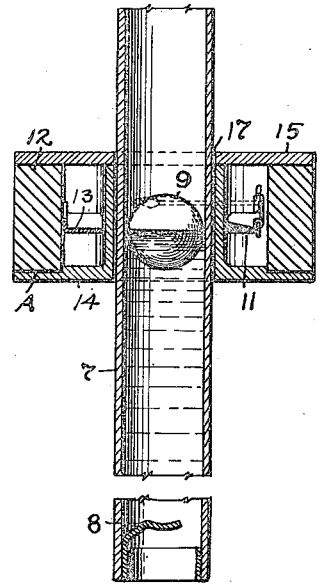
Figure 3:
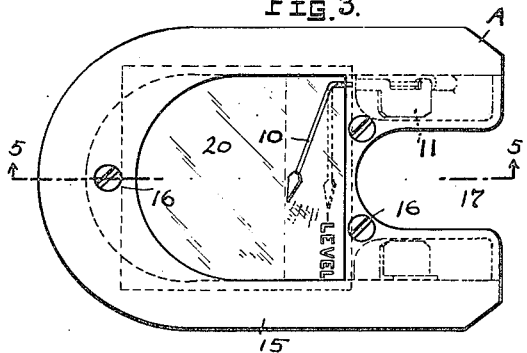
Figure 4:
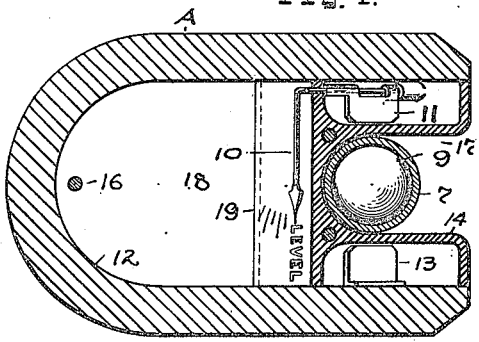
Figure 5:
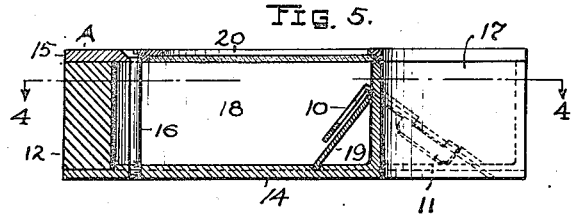

In the accompanying drawing, Fig. 1 is a side view of one end of an ammonia receiver equipped with gauge cocks and a non-transparent non-magnetic gauge tube, and showing my improved magnetic indicator held in the hand of an operator in a sliding position on the tube. Fig. 2 is an enlarged sectional view of the gauge tube and indicator on line 2—2, of Fig. 1. Fig. 3 is an enlarged plan view of the indicator, and Fig. 4 is a horizontal section on line 4—4, of Fig. 5, and Fig. 5 is a longitudinal vertical section on line 5—5, of Fig. 3.

As shown, the ammonia receiver 2 is provided with pipe connections 3 and 4 at its top and bottom for separate gauge cocks 5 and 6 which are detachably connected with a gauge tube 7. In refrigerating and other plants where ammonia is stored and handled, it is customary to use glass gauge tubes on the ammonia receivers, and to avoid leakage and breakage the gauge cocks are kept closed. Whenever a reading is desired the cocks are opened and the glass tube is subjected suddenly to the high pressure. Frequently, the glass gauge tubes break and the attendant is injured; the ammonia fumes are also liberated, and the charge is lost. The dangers and objections are so great with the use of glass gauge tubes that the attendants refuse or neglect to use them, with consequent loss in efficiency in the operation of the plant. To overcome this condition I use a non-transparent and non-magnetic tube 7 adapted to withstand such high pressures, preferably an aluminum tube which has been treated or plated to prevent any deleterious action of the ammonia. Within the bottom end of this tube I insert a stop or rest member 8, together with a buoyant or gravity member, preferably a ball 9 of magnetic metal. This member or ball may be hollow with relatively thin walls so that it will float readily, or its weight may exceed the weight of the liquid displaced so that it will sink or gravitate slowly to the bottom of the tube, or it may be a perforated light hollow ball which will gravitate to the bottom of the tube when filled with liquid.

Having an ammonia receiver 2 equipped with a gauge tube and ball as described, it is possible to determine the level of the liquid within the receiver by placing a magnetic indicator A in a sleeved position over the bottom end of tube 7 and then sliding the indicator upwardly in contact with the tube until an indicating needle 10 affixed to a pivoted armature 11 is deflected or moved to denote that the surface or level of the liquid in the tube and receiver has been reached. If a floating steel ball is used the needle will be deflected the instant the armature 11 reaches the ball at the surface of the liquid, but if the ball is seated at the bottom of the tube and device A applied at that point the armature will be deflected and remain deflected while the ball is being lifted to the surface of the liquid by the magnet. Then as the ball begins to emerge from the liquid and is deprived of the upward pressure exerted upon it by the fluid, the weight of the ball overcomes the maximum magnetic attraction of the device and lags or moves more slowly and deflects the armature and needle, thereby indicating that the level of the liquid has been reached. Where a perforated ball is used the weight of the ball plus the liquid therein acts to deflect the armature and needle when the ball reaches the surface of the liquid. By moving the device A slowly up and down on the tube slightly above and below the liquid level the needle will change its position as the ball emerges from or is submerged in the liquid, thus indicating the liquid level by the movement of the needle itself, whereas if device A is raised above the level of the liquid to any great extent the needle will not oscillate.

Magnetic device A preferably comprises a horse-shoe magnet 12 having an armature 11 pivoted at the inner side of one of the poles directly opposite a relatively thin flat metal blade 13 affixed to the opposite pole. Blade 13 extends inwardly toward and lies in substantially the same horizontal plane as the armature, and a base plate 14 and a cover plate 15 of brass or other non-magnetizable metal, united by brass screws 16, form a protecting casing for the magnet and its operating parts. Armature 11 is pivotally mounted in an inclined position on the magnet or base plate 14 adjacent a vertical and open-ended recess 17 centrally within the front walled end of the casing, and the width of this recess corresponds approximately to the diameter of tube 7. A rounded seat is also preferably provided at the base of the recess to align the tube in respect to armature 11 and blade 13. This seat also guides the device in sliding it along the tube, and the open recess enables the device to be quickly and easily applied and removed from the tube and to be used generally in connection with similarly equipped apparatus.

The axis or pin of armature 11 is extended into the inner space 18 between the legs of the magnet and bent at right angles to provide a needle or finger 10 which will oscillate in an inclined plane opposite an inclined plate 19 inscribed with suitable graduated marks or words beneath a glass sight opening 20 in cover plate 15. This angular arrangement of parts squares the reading plate with an oblique line of sight while permitting the magnet to be held in a horizontal operating position. The foregoing exemplifies one form of the invention, but I do not wish to limit myself to the exact structure shown as various modifications may be made without departing from the spirit or scope of the invention.

What I claim is:

1. A liquid level indicator for ammonia receivers and other apparatus, comprising a non-magnetic gauge column containing a movable magnetic element adapted to settle within the liquid in the column, and a magnetic device slidably engageable with the exterior of said column and carrying an armature adapted to be deflected by said magnetic element in raising or lowering said device longitudinally of said column.

2. A liquid level indicator for ammonia receivers and other apparatus, comprising a gauge column of non-magnetic metal, a movable magnetic element adapted to gravitate within the liquid in said column, and a magnet adapted to be movably applied to the outside of said column and carrying an armature within its magnetic field adapted to co-act with said movable element in indicating the level of the liquid within the column.

3. A liquid level indicator for ammonia receivers and other apparatus, comprising a non-magnetic metal gauge tube, a magnetic metal element of light weight submerged within the liquid in said tube, and a permanent magnet having a movable armature between the poles thereof and an opening adjacent said armature to receive the tube, said magnet and armature being movable vertically upon said tube.

4. A liquid level indicator for ammonia receivers and other apparatus, comprising a non-magnetic metal gauge column, a magnetic liquid-displacement member of light weight within said column, a magnet having the poles thereof disposed upon opposite sides of said column and movable longitudinally of said column, and a movable armature mounted upon one of the poles of said magnet having an index member connected therewith.

5. A liquid level indicator for ammonia receivers and other apparatus, comprising a non-magnetic metal gauge column having a magnetic metal element submerged within the liquid therein, a magnet movably associated with said column and adapted to raise said element to the surface of the liquid within the column, and means adapted to indicate a differential movement between said magnet and element when said element reaches said surface.

6. A liquid level indicator for ammonia receivers and other apparatus, comprising a non-magnetic metal gauge column, a magnetic element vertically movable within said column, a horse-shoe magnet having the poles thereof straddling said column and slidable longitudinally thereon, a pivoted armature carried by said magnet, and an indicating needle connected with said armature.

Signed at Cleveland, in the county of Cuyahoga and State of Ohio, this 29th day of January, 1921.

DUDLEY H. SCOTT.